Nov. 7, 1961 F. R. MARINDIN 3,007,286
AUTOMATIC GRINDING MACHINE
Filed March 28, 1960 7 Sheets-Sheet 1

INVENTOR
Frederick R. Marindin
BY
Blair, Spencer + Buckles
ATTORNEYS

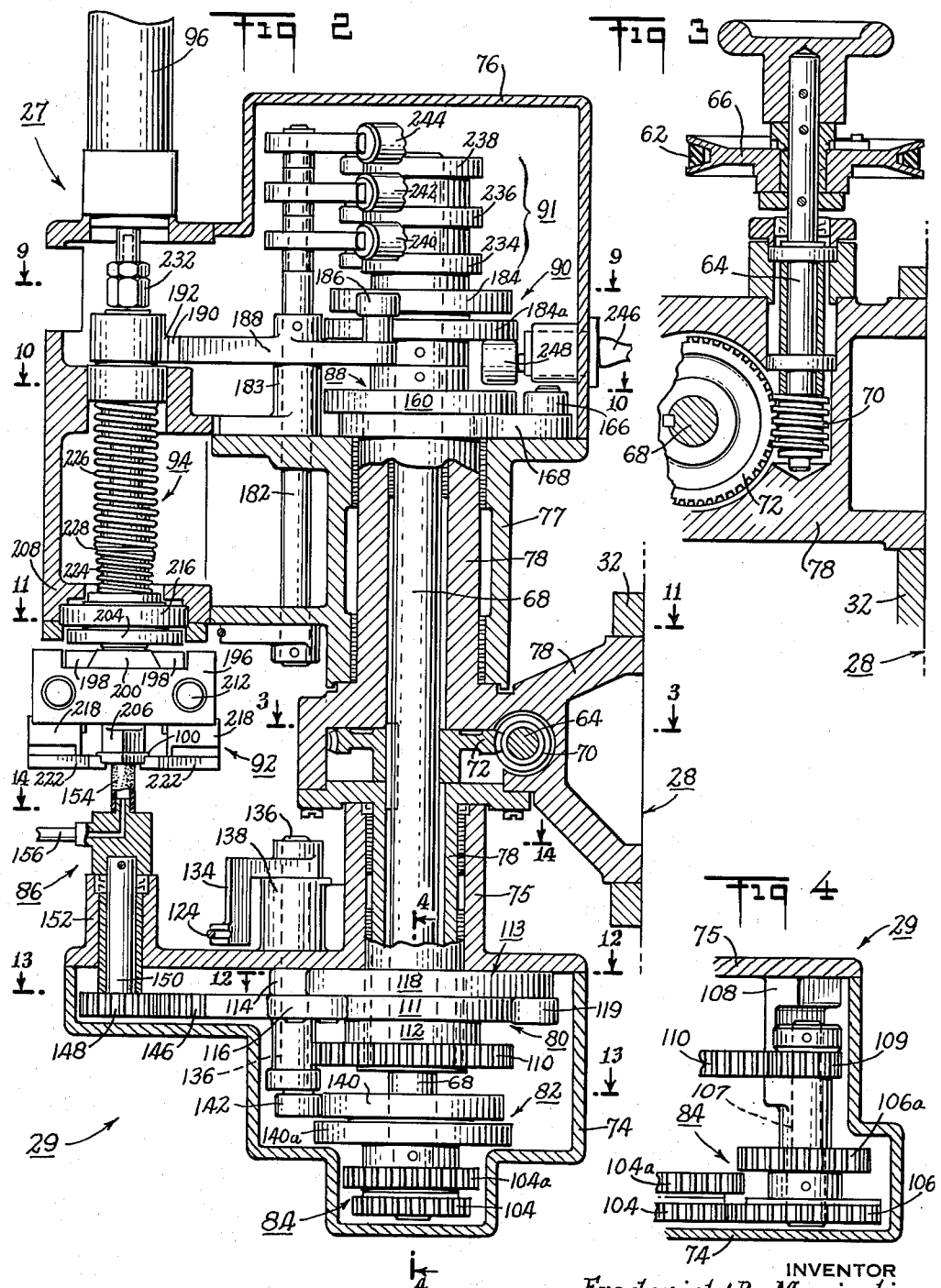

Nov. 7, 1961  F. R. MARINDIN  3,007,286
AUTOMATIC GRINDING MACHINE
Filed March 28, 1960  7 Sheets-Sheet 3
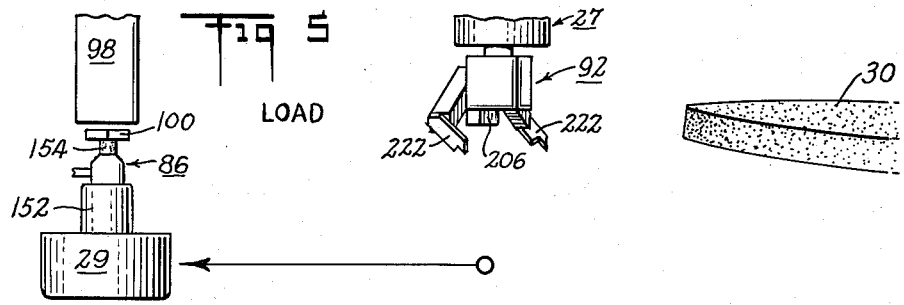
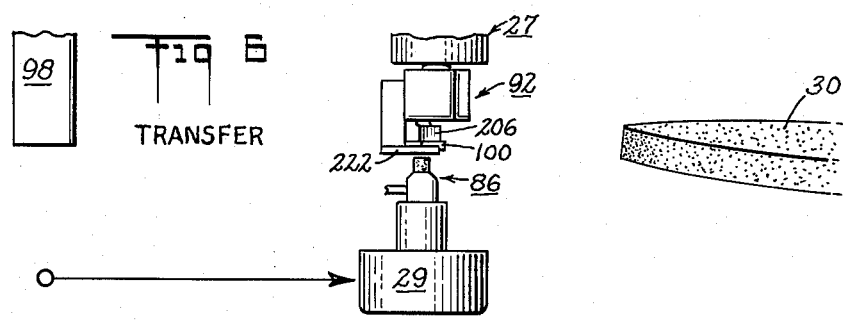
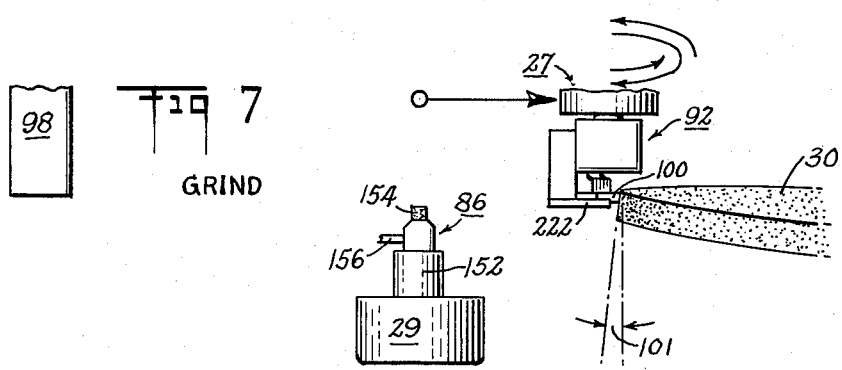
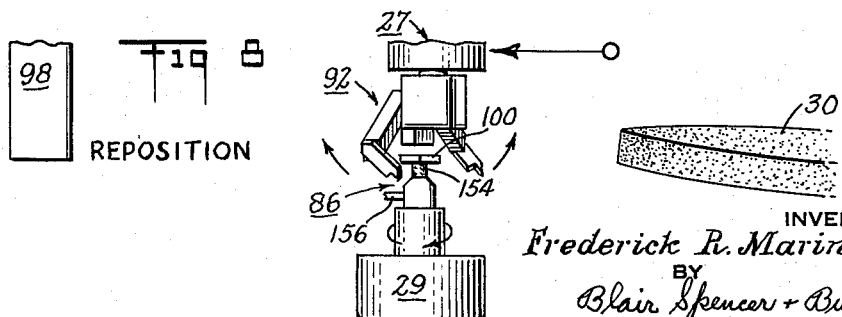
INVENTOR
Frederick R. Marindin
BY
Blair, Spencer + Buckles
ATTORNEYS Nov. 7, 1961   F. R. MARINDIN   3,007,286
AUTOMATIC GRINDING MACHINE
Filed March 28, 1960   7 Sheets-Sheet 4

INVENTOR
Frederick R. Marindin
BY
Blair, Spencer + Buckles
ATTORNEYS

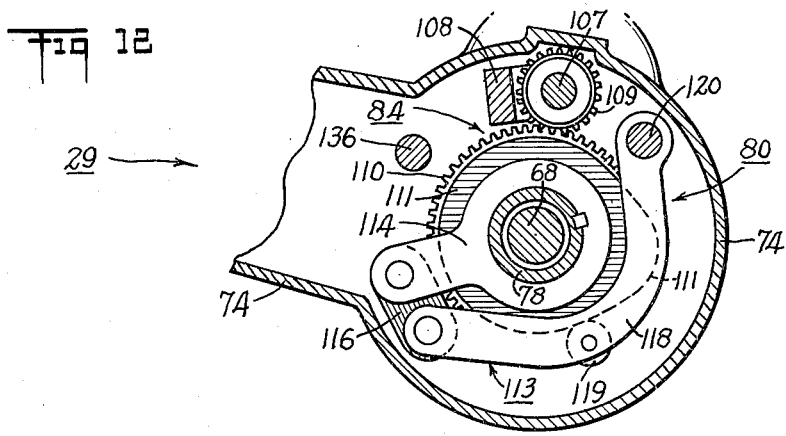
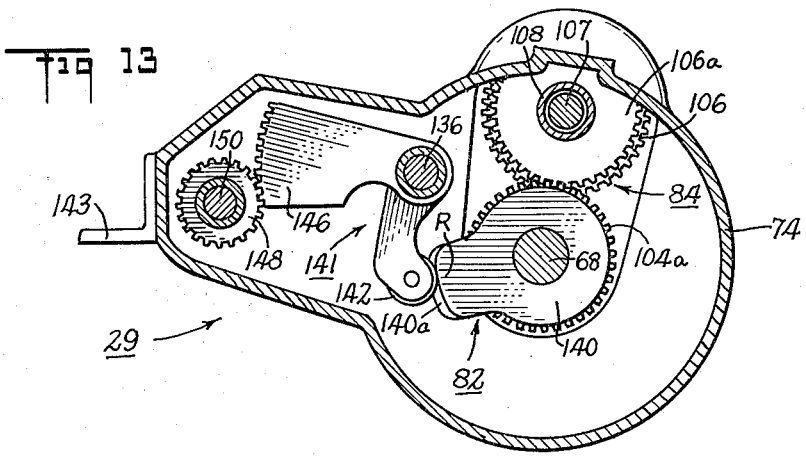
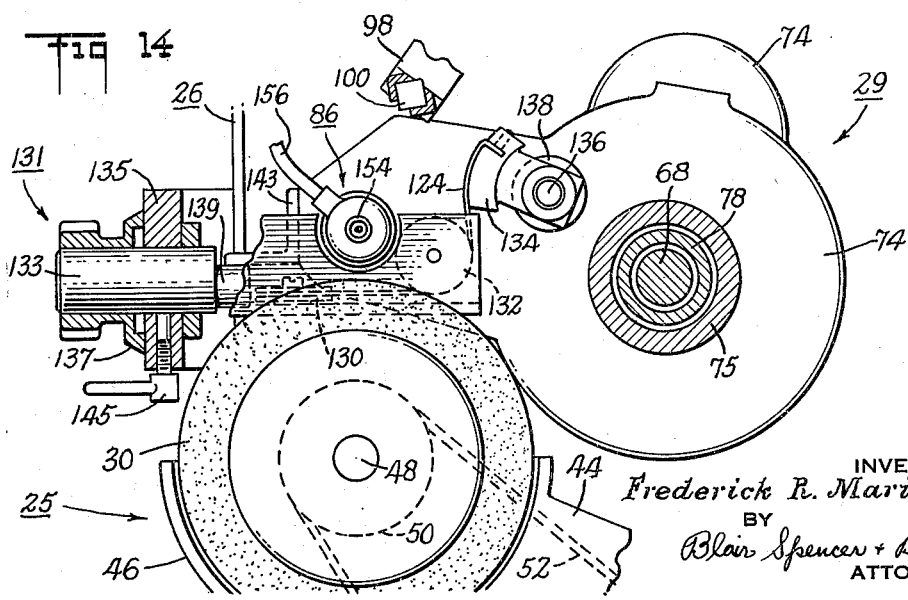

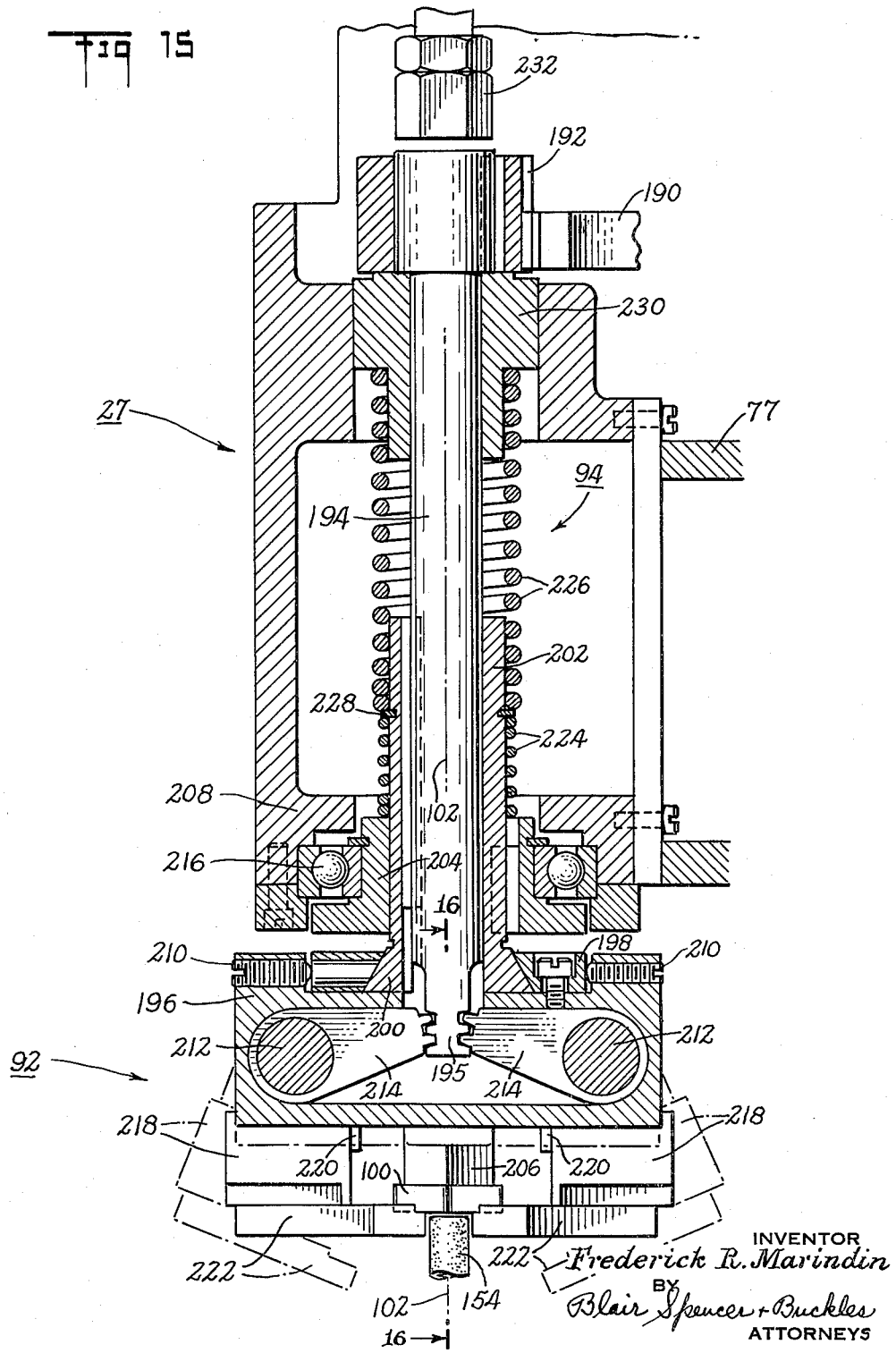

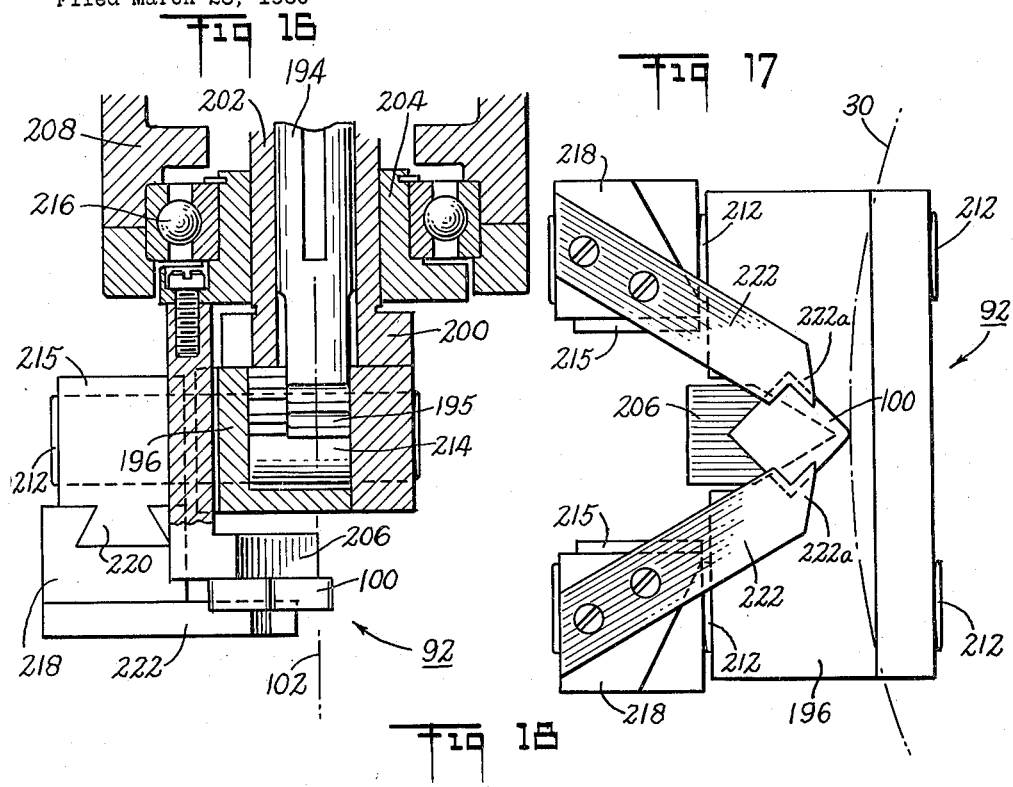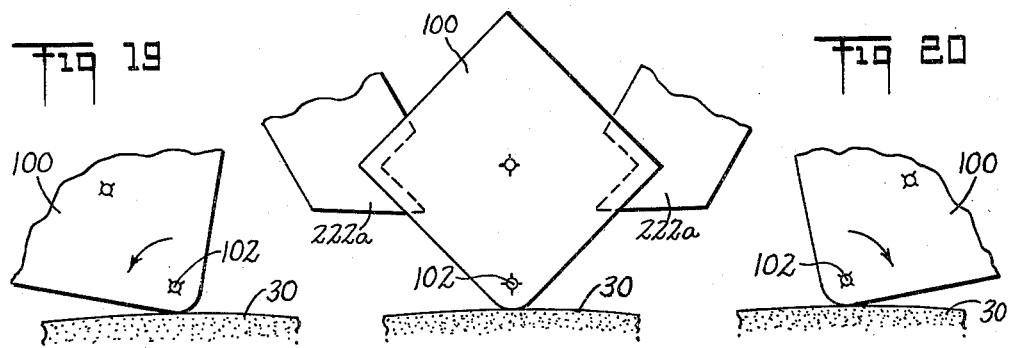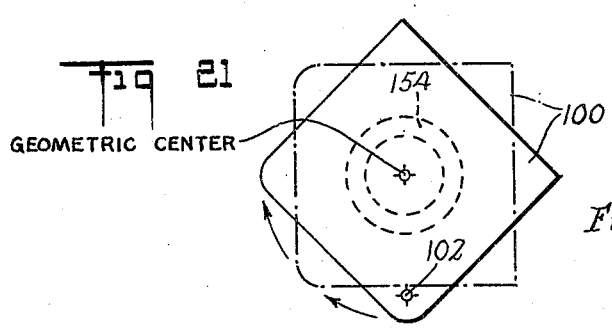

United States Patent Office 3,007,286
Patented Nov. 7, 1961

3,007,286
AUTOMATIC GRINDING MACHINE
Frederick R. Marindin, Woodbury, Conn., assignor to Doran Brothers, Inc., Danbury, Conn.
Filed Mar. 28, 1960, Ser. No. 17,930
16 Claims. (Cl. 51—46)

This invention relates to automatic machine tools for production line machining operations, and more particularly to automatic grinding machines for finishing the faces or edges of small blanks, such as carbide cutting tool inserts and the like.

Laborious and expensive hand grinding techniques have heretofore been required in the grinding and finishing of such small items as the carbide cutting tool inserts mounted in tool holders and employed as cutting elements in lathes and similar machine tools. These tool bit segment or inserts are customarily square or triangular in shape, with their corners being ground and sharpened to form the cutting edges of the tool. The sharping of three or four corners or more of such a small segment or blank through the use of a grinding wheel has required complex mechanisms for holding the tool bit being sharpened in grinding position, and the constant attention of a grinding operator during successive hand grinding operations to sharpen the corners of each segment.

The increasing use of such carbide cutting tool inserts has created an important need for an automatic grinder providing mass production grinding and finishing of such small elements without the constant attendance of a machine operator. In order to be fully automatic, however, such a grinding machine must be adapted to position and re-position the work between successive grinding operations, and particularly to adjust the work pivotally during such operations or to move the work pivotally or otherwise during grinding.

Similar work-handling difficulties are encountered with other types of machine tools, particularly automatic or semi-automatic equipment in which a work piece must be positioned, repositioned, or moved during or between machining operations.

Accordingly, a principal object of the present invention is to provide a machine tool adapted to position and reposition the work in consecutive adjusted machining positions automatically.

Another object of the invention is to provide a machine tool of the above character adapted to move the work pivotally between consecutive machining operations to bring it into new adjusted machining positions.

A further object of the invention is to provide a machine tool of the above character adapted to move the work pivotally during machining operations to produce preselected machined surfaces or edges thereon.

An additional object of the invention is to provide a machine tool of the above character incorporating an automatic magazine system for automatic supplying of blanks to be machined.

A further object of the invention is to provide a machine tool of the above character adapted for grinding carbide cutting tool bit inserts or segments to produce preselected cutting edges thereon.

Still another object of the invention is to provide a machine tool of the above character incorporating work positioning and adjusting elements all actuated by a common power-driven cam shaft.

Other objects of the invention will be in part obvious and will in part appear hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 2 is a vertical sectional side view of a portion of the machine shown in FIGURE 1, showing the work conveying and gripping mechanism and their actuating elements;

FIGURE 3 is a fragmentary horizontal sectional view of the central portion of the assembly shown in FIGURE 2, taken along the line 3—3 of FIGURE 2;

FIGURE 4 is a fragmentary rear sectional view of the lower portion of the assembly shown in FIGURE 2, taken along the line 4—4 of FIGURE 2;

FIGURES 5, 6, 7 and 8 are schematic diagrams showing the positions of various separate elements of the machine shown in FIGURE 1 during different stages of an automatic grinding operation;

Figure 9:
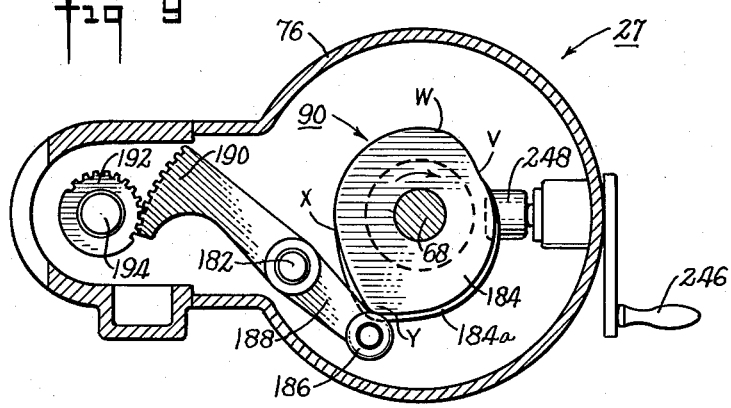
Figure 10:
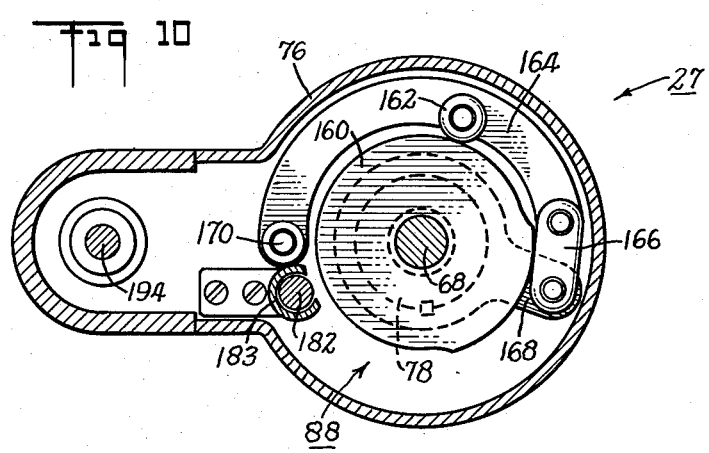
Figure 11:
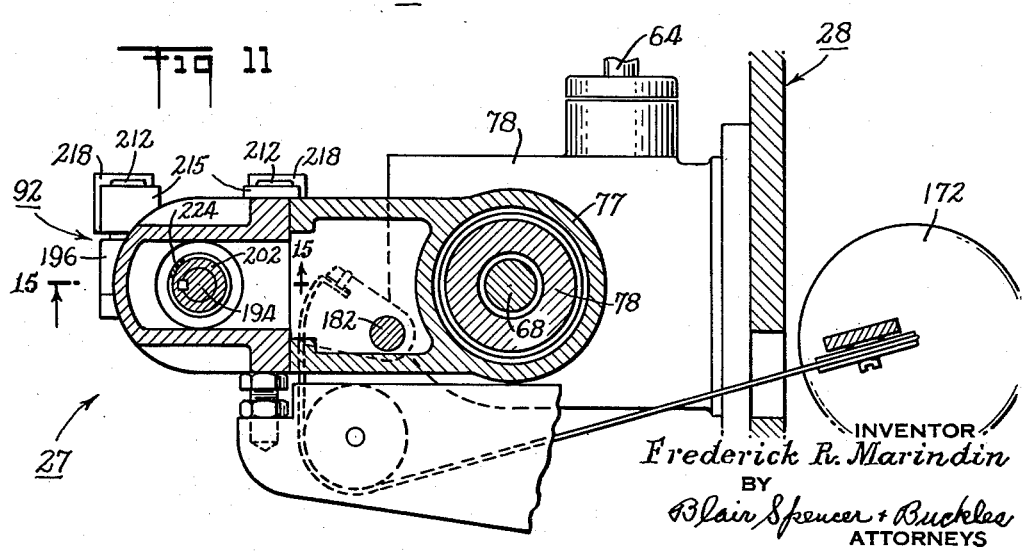

FIGURES 9, 10, and 11 are fragmentary horizontal sectional views of adjacent portions of the upper end of the assembly shown in FIGURE 2, and respectively taken along the lines 9—9, 10—10, and 11—11 in FIGURE 2;

FIGURES 12, 13 and 14 are fragmentary horizontal sectional views of adjacent portions of the lower end of the assembly shown in FIGURE 2, and respectively taken along the lines 12—12, 13—13, and 14—14 in FIGURE 2;

FIGURE 15 is an enlarged fragmentary vertical sectional side view of the chuck portion of the assembly shown in FIGURES 2, 9, 10, and 11, taken along the line 15—15 in FIGURE 11;

FIGURE 16 is a fragmentary front sectional view of a portion of the assembly shown in FIGURE 15, taken along the line 16—16 in FIGURE 15, showing the chuck jaws of the device;

FIGURE 17 is a fragmentary bottom view of the chuck jaw mechanism shown in FIGURE 16;

FIGURES 18, 19 and 20 are greatly enlarged fragmentary schematic views showing the jaws and work in contact with the grinding wheel at different times during a grinding operation, and FIGURE 21 is an enlarged schematic view illustrating the re-positioning of the work between grinding operations as performed by the devices of the present invention.

Similar reference characters refer to similar parts throughout the views of the drawings.

Figure 1:
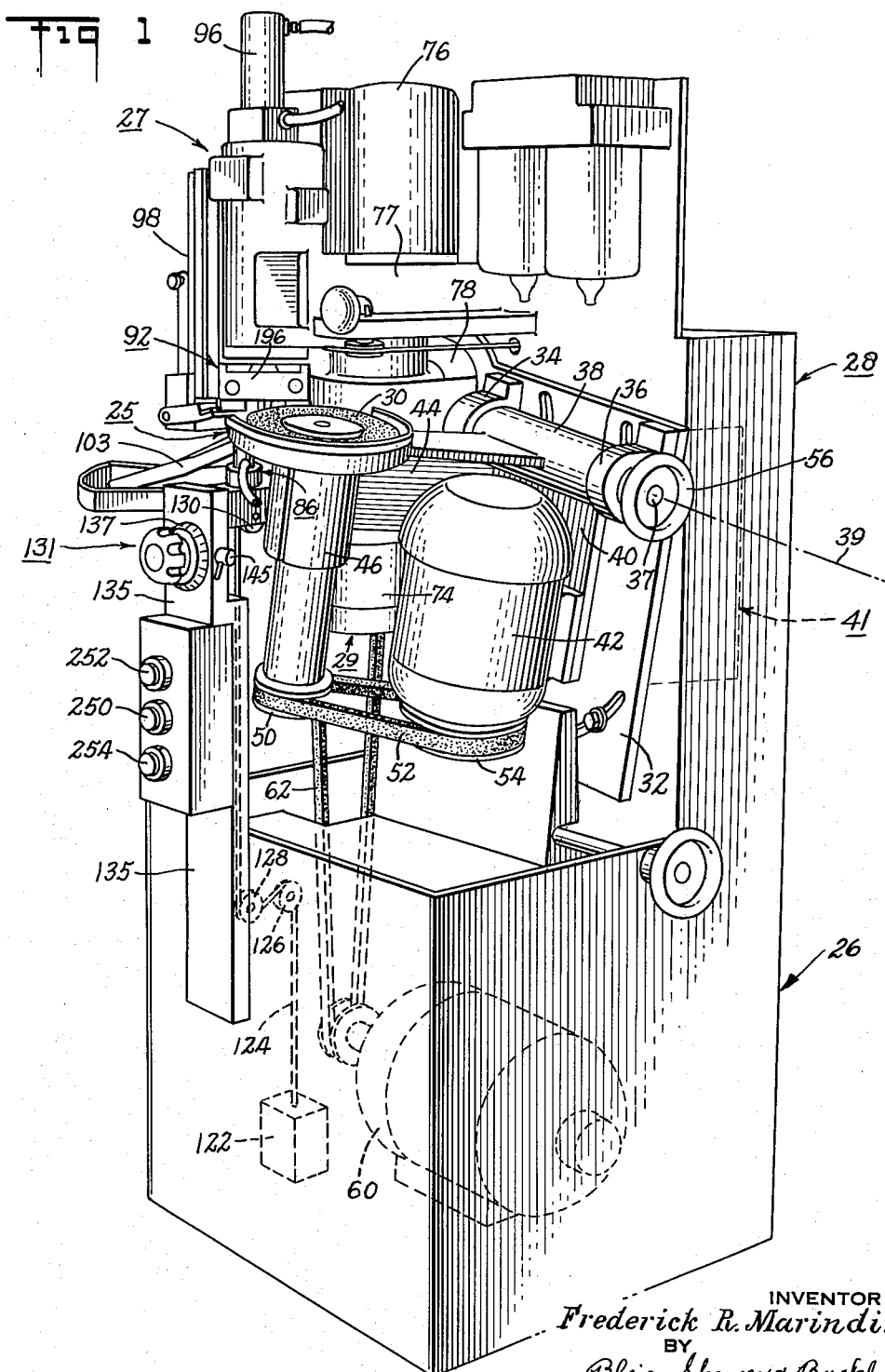
FIGURE 1 is a perspective view of an automatic grinding machine incorporating one embodiment of the present invention.

A complete automatic grinding machine incorporating one embodiment of the present invention is shown in perspective in FIGURE 1. In this grinding machine, a supporting structure for the remaining assemblies and subassemblies of the machine is formed by a motor housing or base generally indicated at 26, and an upstanding rear pedestal generally indicated at 28. The grinding wheel subassembly generally indicated at 25 is adjustably mounted on pedestal 28. A chuck arm assembly 27 and a work conveying arm subassembly 29 are movmounted on pedestal 28 (FIG. 2) adjacent a power-driven grinding wheel 30. A common drive mechanism, shown in more detail in FIGURE 2, actuates both the conveying arm subassembly 29 and the chuck arm subassembly 27. This driving mechanism utilizes a common cam shaft 68 operating cam and gear mechanisms in each of these arm subassemblies.

The grinding wheel subassembly 25 is shown in detail in FIGURE 1, and this subassembly includes the grinding wheel 30 driven by a motor 42, with the grinding wheel 30, the motor 42 and their supporting and adjusting elements all being mounted on pedestal 28 as described in more detail hereinafter.

The driving mechanism for the two conveying arm subassemblies is shown in FIGURES 1, 2 and 3. A driving motor 60 shown mounted within base 26 in FIGURE 1 is drivingly connected by a belt 62 to a power shaft 64 by way of a sheave 66 keyed thereto. A worm 70 keyed to the end of power shaft 64 meshes with a power gear 72 keyed to the common cam shaft 68. Shafts 64 and 68 are both rotatably mounted within a fixed cam shaft housing member 78, supported by the pedestal 28 as shown in FIGURES 2 and 3. Cam shaft 68 projects upwardly into a chuck arm housing 76 and downwardly into a somewhat similar conveying arm housing 74, both of these housings being mounted for pivotal movement about the central vertical cylindrical portions of shaft housing 78, as shown in FIGURE 2.

The conveying arm subassembly 29 is shown in detail in FIGURE 2. The subassembly is enclosed in the conveying arm housing 74, which forms a case surrounding the conveying arm actuating cam mechanism 80 positioned adjacent the shaft housing 78, the work positioning cam mechanism 82 located beneath the cam mechanism 80, and also a reduction gear train generally indicated at 84 and shown in FIGURES 2 and 4, connected to drive the arm-positioning cam mechanism 80 at a reduced speed. A work-holding mechanism generally indicated at 86 is pivotally supported at the outer end of conveying arm housing 74 as shown in FIGURE 2, and mechanism 86 is adapted to receive a workpiece or segment 100 from a suitable magazine 98 as shown in FIGURE 5 and to carry each of these segments to a transfer position beneath chuck arm 27 as shown in FIGURE 6. Holding mechanism 86 on conveying arm 29 is also adapted to re-position these segments between grinding operations. In FIGURE 5, the conveying arm 29 is shown beneath magazine 98, having just received a segment 100 therefrom. In FIGURE 6, conveying arm 29 is shown in the transfer position beneath chuck arm 27.

The chuck arm subassembly 27 is shown in detail at the upper end of cam shaft 68 in FIGURE 2, and this subassembly includes a chuck arm positioning cam mechanism 88 and a work-rocking cam mechanism 90, as well as three air-valve actuating cams generally indicated at 91 at the upper end of the shaft 68. The chuck arm 27 supports a workpiece-gripping chuck jaw mechanism generally indicated at 92 adjacent the work holding mechanism 86 on conveying arm 29. The chuck jaw mechanism 92 is actuated by a plunger assembly 94 positioned within the outer end of chuck arm 27 and actuated by an air cylinder 96 mounted above the plunger assembly 94 on chuck arm 27.

The various automatic steps in the operating cycle of the grinding machine shown in FIGURE 1 are illustrated in the schematic diagrams of FIGURES 5-8. In the receiving step illustrated schematically in FIGURE 5, the conveying arm 29 moves into a loading position under the blank-dispensing magazine 98 and receives therefrom one workpiece or segment 100 which is gripped by the workpiece-holding mechanism 86.

As shown in FIGURE 6, the conveying arm 29 then moves to its transfer position beneath the chuck arm 27 and the work-piece-gripping chuck jaw mechanism 92, shown in its open position in FIGURE 5, now closes to seize the segment 100 from the work-holding mechanism 86 and to hold the element 100 firmly against an anvil 206; these chuck elements being shown in more detail in FIGURES 15-17. As shown in FIGURE 17, the element 100 is held by the chuck jaw mechanism 92 in grinding position, with one of its corners projecting toward the grinding wheel 30.

As shown schematically in FIGURE 7, the chuck arm then carries the segment 100 toward grinding wheel 30, and brings the segment 100 into grinding contact with the edge of the wheel. During each grinding operation the desired radius of curvature is produced on the corner of segment 100 by the pivotal rocking motion imparted to the chuck mechanism 92 by rocking cam mechanism 90 (FIGURES 2 and 9). As shown in FIGURES 16 and 18, the chuck jaw mechanism 92 is offset in such a manner that the center line of the pivoting chuck mechanism forms a grinding center 102 positioned closely adjacent the corner of the element 100 being ground. Pivotal rocking motion of the chuck mechanism 92 about the grinding center 102 thus creates the desired radius of curvature on the corner of the segment.

After grinding the desired radius and rake angle 101 on one corner of element 100 (FIGURE 7), chuck arm 27 returns to the transfer position (FIGURE 8). Chuck jaw mechanism 92 opens, and the element 100 is gripped by the work-holding mechanism 86, which is then rotated through 90 degrees (FIGURE 21) by the work-positioning cam mechanism 82, thus bringing the next unground corner of element 100 into grinding position. The operations shown in FIGURES 6 and 7 are then repeated: chuck jaw mechanism 92 closes, gripping segment 100 against anvil 206; chuck arm 27 moves into grinding position at wheel 30; and the offset chuck jaw mechanism 92 is pivotally rocked to grind the desired radius of curvature on the newly-presented corner of segment 100.

These successive grinding and work re-positioning operations are repeated automatically until all corners of the segment 100 have been ground to form cutting edges with the desired rake angle and radius of curvature.

When the required number of grinding operations are completed, conveying arm 29 moves toward its loading or receiving position under magazine 98 (FIGURE 5) while chuck arm 27 moves from its machining position (FIGURE 7) to its transfer position (FIGURE 5). Chuck jaw mechanism 92 then opens and releases the completed segment 100 directly to an exit chute 103 (FIGURE 1). The workpiece-holding mechanism 86 receives a fresh workpiece or segment from magazine 98 and the same automatic cycle of grinding and positioning operations is then repeated on this new segment.

Supporting base and pedestal

A sturdy structural support for the movable elements of the grinding machine shown in FIGURE 1 is provided by the motor enclosure or base portion generally indicated at 26. The main driving motor 60 is securely mounted within this base portion 26 and electrical wiring conduits and control switch boxes may be conveniently mounted therein or secured thereto. A sturdy pedestal 28 projects upwardly from the rear of motor housing 26, providing a firm support for the grinding wheel subassembly 25 and the work-supporting and conveying subassemblies 27 and 29. The various desired components of lubricating systems, a coolant supply systems and pneumatic or hydraulic actuating system for controlling the operation of the arm subassemblies 27 and 29 are also preferably housed within base 26 and pedestal 28, or secured thereto.

Grinding wheel subassembly

In the grinding machine shown in FIGURE 1, the machining of segments is performed by a grinding wheel 30, adjustably and drivingly supported by a grinding wheel subassembly 25 mounted on pedestal 28. An angularly-adjustable mounting plate 32 is adjustably secured in a vertical plane to the front portion of pedestal 28.

Angular adjustment of plate 32 changes the plane of rotation of grinding wheel 30, thereby adjusting the rake angle 101 imparted by wheel 30 to the segment 100 being ground (FIGURE 7). Wheel 30 is shown inclined at a slight angle in FIGURES 5-8, producing a corresponding rake angle 101 on the ground edge of segment 100 (FIGURE 7). Bearing blocks 34 and 36 are mounted on the plate 32 close to its upper corners, and a shaft 37 is rotatably supported in bearings mounted in these two bearing blocks 34 and 36. A sturdy sleeve 38 is mounted for pivotal movement on this shaft 37 and a heavy rocking plate 40 depends vertically downward from sleeve 38. Motor 42 is secured to rocking plate 40.

Cantilever arm 44 projects forwardly from sleeve 38 and rocking plate 40, and bearing housing 46 is formed at the outer end of arm 44. Grinding wheel 30 is mounted on a shaft 48 rotatably supported by suitable bearings within bearing housing 46. A drive sheave 50 is keyed to the lower projecting end of shaft 48 and is joined by a belt 52 to a driving sheave 54 on the shaft of motor 42.

It will be seen that the wheel 30 and the motor 42 with their supporting structures form an integral unit pivotally movable about the axis 39 of the shaft 37, on which sleeve 38 is pivotally mounted. A motor-driven rocking cam mechanism 41 (shown schematicaly in FIGURE 1) for equalizing peripheral wear on the edge of grinding wheel 30 is mounted within pedestal 28. The rocking cam mechanism 41 projects through a suitable slot in the front face of pedestal 28 and adjustable plate 32 behind the rocking plate 40. This rocking cam mechanism is adapted to produce a slight rocking or oscillating motion of the grinding wheel 30 and its driving motor 42 and their associated supporting elements about axis 39 of shaft 37. A hand wheel 56 is provided at the end of shaft 37, and rotation of hand wheel 56 advances sleeve 38 along shaft 37 through suitable threaded interconnection therebetween, thereby advancing grinding wheel 30 towards the work and providing a compensating adjustment for peripheral wear of grinding wheel 30. Grinding wheel 30 is thus suported by the various elements of wheel subassembly 25 in grinding position adjacent the work holding arms 27 and 29. Wheel oscillation is provided to equalize wheel wear; angular adjustment of plate 32 varies the rake angle produced by wheel 30; and adjustment of hand whel 56 advances the wheel 30 to compensate for wear of its periphery.

*Conveying arm-actuating cam mechanism*

Automatic movement of the conveying arm subassembly generally indicated at 29 between the transfer position of FIGURE 6 and the loading position of FIGURE 5 is required once for every four corner-grinding operations when the machine is employed in grinding the four corners of a square segment such as that shown in FIGURE 17. A single revolution of the driven cam shaft 68 actuates the mechanism of the chuck arm 27 to complete the grinding of one corner of such a segment, and four revolutions of the cam shaft 68 are therefore required to complete the grinding of all four corners of the segment 100. Accordingly, a four-to-one reduction gear drive is generally indicated at 84 in FIGURES 2 and 4. Reduction gear drive 84 is mounted within conveying arm subassembly 29 to actuate the cam mechanism generally indicated at 80 in FIGURE 2, which produces the required movement of arm 29 between the transfer and loading positions after grinding operations are completed.

The reduction gear mechanism 84 includes a driving gear 104 keyed to the lower end of shaft 68 and meshing with a driven gear 106 keyed to a spur shaft 107 rotatably mounted within a bracket 108 secured to the conveying arm housing generally indicated at 74. A gear 109 keyed to the upper end of spur shaft 107 meshes with a larger gear 110, which is integrally secured to cam 111 by a sleeve 112 mounted for free rotation about the axis of shaft 68. This gear train produces one revolution of gear 110 and cam 111 for every four revolutions of the cam shaft 68.

A cam follower mechanism 113 (FIGURE 12) includes a fixed crank 114 keyed to the lower end of cam shaft housing 78 and pivotally connected by a link 116 to a curved follower arm 118 carrying a follower roller 119 in contact with the periphery of cam 111. The curved follower arm 118 has its further end pivotally joined to conveying arm housing 74 by a pin 120.

When follower roller 119 is urged outwardly by the maximum radius or peak of cam 111 (FIGURE 12), the curved follower arm 118 is urged outwardly, drawing fixed pin 120 and conveyor arm housing 74 in a clockwise direction. Housing 74 is provided with an upwardly-projecting sleeve 75 pivotally mounted surrounding cam shaft housing 78 (FIGURE 2), and the clockwise pivotal movement of conveying arm housing 74 moves the work-gripping mechanism 86 from the transfer position (FIGURE 6) to the loading position (FIGURE 5) beneath magazine 98.

Conveying arm housing 74 is normally urged in a counter-clockwise direction (as viewed in FIGURE 12) by the operation of a follower weight system shown in FIGURES 1, 2, and 14. A follower weight 122 is joined by a cable 124, passing over sheaves 126, 128, 130 and 132 (FIGURE 14) pivotally mounted on base 26 to a follower sector crank 134. Crank 134 is keyed to a follower shaft 136 pivotally mounted within a bushing 138 projecting upwardly from conveying arm housing 74. Shaft 136 extends downwardly through bushing 138 within housing 74, and forms an integral part of a follower unit 141 shown in FIGURE 13 and described in more detail hereinafter. The counterclockwise torque applied to shaft 136 by follower weight 122 urges follower unit 141 in a counterclockwise direction and also has the effect of urging the entire conveying arm mechanism 29 in a counterclockwise direction, acting through bushing 138 and arm housing 74. The conveyor arm 29 is thus urged to its transfer position at all times during the operating cycle of the machine, except when cam 111 (FIGURE 12) urges follower arm 118 outwardly to draw the conveyor arm housing 74 clockwise, bringing arm 29 to the loading position of FIGURE 5. Since cam 111 is driven by the 4 to 1 reduction gear train 84, this pivoting movement of conveyor arm 29 occurs only once for every four revolutions of cam shaft 68.

The counterclockwise travel of conveying arm 29, urged by the action of follower weight 122, is arrested by an eccentric stop mechanism generally indicated at 131 in FIGURE 14, and mounted on an upwardly-projecting plate 135 secured to base 26. A rotatably adjustable dial shaft 133 extending through a suitable aperture in plate 135 has a calibrated dial 137 secured to its projecting forward end and an eccentric stud 138 projecting from its rearward end. Stop member 143 extending forward from the outer projecting end of conveying arm housing 74 adjacent the workpiece-holding mechanism 86 seats against the eccentric stud 139, thus governing the extreme counterclockwise position, or transfer station, of conveying arm subassembly 29. The calibrated dial 137, which may be locked in any adjusted position by a setting clamp 145, thus provides precise adjustment of the work-holding mechanism 86 beneath the transfer opsition of the chuck arm 27 (FIGURE 6). Adjustment of dial 137 thus permits precise alignment of the transfer positions of the two arms 27 and 29 to facilitate proper transfer of each segment 100 therebetween.

*Work-positioning cam mechanism*

The re-positioning of segment 100 between grinding cycles to bring the next corner of the segment into grinding position is described above with respect to FIGURES 7 and 8. This re-positioning is achieved by the 90 degree rotary movement of workpiece-holding mechanism 86 while this mechanism is holding the segment 100 between the grinding operations.

This 90 degree rotary movement is produced by the operation of the work-positioning cam mechanism 82 (FIGURES 2 and 13). A cam 140, keyed to the central cam shaft 68 for rotation therewith, has its periphery in contact with the follower 142 which forms a part of the follower unit 141, and is integral with the downwardly-extending follower shaft 136 described above. Unit 141 also includes a projecting tooth sector rack 146 keyed to the shaft 136, and the teeth of rack 146 engage a pinon 148 keyed to the lower end of a shaft 150 rotatably mounted in an upwardly-projecting terminal bushing 152 (FIGURE 2) at the outer end of conveying arm housing 74.

The work holding mechanism 86 includes a suction grip 154 projecting upwardly toward the chuck jaws 92 and connected to a vacuum supply line 156. Grip 154 is mounted on the upper projecting end of shaft 150.

When follower 142 is in contact with the constant minimum radius or dwell forming the greater peripheral portion of cam 140, the shaft 150 is stationary because the follower weight 122 and associated mechanism described above urges follower shaft 136 in a counterclockwise direction, maintaining follower 142 in contact with this constant radius dwell of cam 140. When peak R of cam 140 rotates into position and urges follower 142 outwardly the follower unit 141 rotates in a clockwise direction, causing the sector rack pinion mechanism to rotate grip 154 through 90 degrees. This 90-degree rotation brings a fresh corner of segment 100 into grinding position as shown in FIGURE 21.

The chuck jaws 92 remain open during this re-positioning rotation of the segment 100, as indicated in FIGURE 8. When re-positioning is completed, the chuck jaws 92 again close to seize and grip the segment as shown in FIGURE 6, and the next grinding operation follows.

Chuck arm subassembly

As shown in FIGURES 6, 7, and 8, the chuck arm 27 must move from its transfer position above the conveying arm 29 to a grinding position shown in FIGURE 7 in which the chuck jaws 92 hold the segment 100 in grinding contact with wheel 30 while the chuck rocks pivotally from side to side (FIGURES 18–20) to grind the desired radius of curvature on segment 100. The chuck arm must then return to the transfer position as shown in FIGURE 8 with the chuck jaws 92 opening to surrender the segment 100 to workpiece-holding mechanism 86 for re-positioning, or to release the completed segment to the exit chute 103. These necessary movements are all actuated by the different mechanisms shown incorporated in chuck arm 27 in FIGURE 2 and shown in more detail in FIGURES 9–11 and 15–17. Chuck arm 27 includes the housing 76 having a downwardly-projecting sleeve portion 77 rotatably mounted on the upwardly-projecting cylindrical portion of fixed shaft housing 78, as shown in FIGURE 2.

The chuck arm positioning cam mechanism generally indicated at 88 in FIGURE 2 is employed to move the chuck arm 27 from the transfer position of FIGURE 6 to the grinding position of FIGURE 7 and back to the transfer position of FIGURE 8. Cam mechanism 88, shown in detail in FIGURE 10, operates in the same manner as does cam mechanism 80 shown in detail in FIGURE 12. In cam mechanism 88, a positioning cam 160 keyed on shaft 68 is in contact with a follower roller 162 carried by a curved follower arm 164 which is connected by a pivoted link 166 to a fixed crank 168 keyed to shaft housing 78; the opposite end of follower arm 164 is joined to chuck arm housing 76 by a pin 170. A follower shaft 182 is urged in a counterclockwise direction by the operation of a second follower weight 172 shown in FIGURE 11 and functioning in the same manner as the follower weight 122 joined to the conveying arm mechanism 29. Follower shaft 182 is rotatably mounted in chuck arm housing 76 within a bushing 183 (FIGURES 2 and 10) and follower shaft 182 therefore cooperates with cam mechanism 88 as shown in FIGURE 10 to maintain the chuck arm 27 in the grinding position of FIGURE 7 except when the maximum diameter dwell point of cam 160 forces follower 162 outwardly, thus drawing chuck arm 27 clockwise to the transfer position of FIGURE 6.

Work rocking cam mechanism

The pivotal rocking motion of chuck jaw mechanism 92 about a vertical center line 102 close to the corner of the segment 100 being ground by the grinding wheel 30 provides the desired radius of curvature of the ground corner cutting edge of the finished segment 100 (as diagrammatically illustrated in FIGURES 18–20). This pivotal rocking motion of the chuck jaw mechanism 92 is produced by the work-rocking cam mechanism 90 shown in detail in FIGURE 9. This mechanism is actuated by a cam 184 keyed to shaft 68 and having a constant diameter dwell portion from W to X with a rise to a peak Y followed by a fall to a valley V and a second rise to the beginning point W of the constant dwell portion W—X. A follower roller 186 is rotatably mounted at one end of a follower arm 188, integrally secured to the follower shaft 182 which urges the arm 188 in a counterclockwise direction about shaft 182, maintaining follower roller 186 against cam 184. The opposite end of follower arm 188 is formed as a toothed sector rack 190 meshing with a pinion 192 keyed to a plunger rod 194 (FIGURE 15) which is connected to chuck jaw mechanism 92 in a manner permitting the transmission of rotary motion from pinion 192 via plunger 194 to chuck jaw mechanism 92.

During the grinding operation of FIGURE 7, the chuck jaw mechanism 92 is centrally positioned (FIGURE 18) as arm 27 moves toward grinding wheel 30 for its initial contact with segment 100. As this contact begins, point X on cam 184 rotates past follower 186 and the rise of the cam from point X to peak Y displaces follower arm 188 in a clockwise direction, producing counterclockwise rotary motion of chuck jaws 92 and segment 100 about th center line 102 of the chuck jaw mechanism 92, as best seen in FIGURES 9 and 16–20. As the peak Y of cam 184 passes follower roller 186, the fall portion of the cam from point Y to point V brings follower arm 188 slowly in a counterclockwise direction, rotating the segment 100 in a clockwise manner from one extreme (FIGURE 19) to the opposite extreme (FIGURE 20). Rise V—W of cam 184 returns the segment 100 to a centered position (FIGURE 18) thus completing the grinding operation, and chuck arm 27 is drawn back to the transfer position of FIGURE 6 by the action of the arm positioning cam mechanism 88 shown in FIGURE 10. In grinding the 90-degree corner of a square segment 100 with this machine, it has been found preferably to employ a total rotary motion of about 80 degrees, 40° on each side of the centered position, thus producing the desired radius of curvature on segment 100 while avoiding conflict of the chuck jaws with the grinding wheel 30.

Chuck jaw mechanism

The workpiece-gripping chuck jaw mechanism 92 shown schematically in FIGURES 5–8 is illustrated in detail in FIGURES 2 and 15–17. This chuck mechanism is required to grip the segment 100 firmly against the anvil 206 (FIGURES 15–17) and hold the segment in this position during the grinding operation, while at the same time pivotally rocking about its vertical center line 102, as described above, to provide the desired curvature on the corner of the segment 100. After completing this pivotal rocking motion, the chuck mechanism must open to release the segment 100 for re-positioning by the conveying arm work-holding mechanism 86, or delivery to the chute 103, as described above. The plunger unit 94 and the cooperating mechanisms illustrated in detail in FIGURES 15–17 are adapted to provide these separate motions.

At the lower end of plunger rod 194 there is positioned a chuck block 196 slidably positioned by adjustable wedge blocks 198 on a slideway 200 positioned at the lower end of a sleeve 202 slidably mounted surrounding plunger rod 194. Sleeve 202 is also slidably mounted within a rotatable flanged bearing collar 204 on which is mounted the inner race of a ball-bearing assembly 216, whose outer race is secured within the outer end 208 of the chuck arm housing 76. Anvil 206 is secured to the flanged bearing collar 204 (FIGURE 16) behind chuck block 196 and extends downwardly thereunder to form a platform against which the chuck jaws can clamp the segment 100 in their closed position. As best seen in FIGURES 15 and 16, the horizontal sliding motion of block 196 relative to slideway 200 permits the adjustment of the clamped segment 100 with respect to the center line 102 of plunger rod 194, thus permitting the convenient preselection and adjustment of the radius of curvature ground on the corners of the segments by this machine. Set screws 210 are provided on both sides of chuck block 196 to fix this adjusted radius of curvature.

Chuck block 196 also incorporates the mechanism required for the closing and opening of the chuck jaws. Pins 212 are journaled in chuck block 196 and toothed jaw cranks 214 are mounted on pins 212 for integral pivoting movement therewith. Toothed cranks 214 are engaged with a toothed rack 195 formed at the lower end of plunger rod 194 in such a manner that downward movement of rod 194 pivots the two cranks 214 and their respective pins 212. Pivot blocks 215 are secured to projecting ends of the pins 212 with jaw blocks 218 respectively and slidably joined thereto by the slideway 220. Chuck jaws 222, secured to the blocks 218, are provided with notched projecting forward ends 222a adapted to receive the segment 100 and to clamp it firmly against the anvil 206.

The elements 212, 214, 215, 218, and 222 form a matched pair of integral movable chuck jaws, and downward movement of the plunger rod 194 causes pivotal movement of these jaws about the axes of the pins 212; this causes the notched ends of jaws 222 to swing downward away from anvil 206, thus releasing segment 100 from the firm grip of the chuck mechanism.

To facilitate the transfer of the segment 100 thus released to work-holding mechanism 86, two different helical coil springs 224 and 226 are incorporated in the plunger rod assembly 94. Spring 224 surrounds the sleeve 202 with its lower end bearing against the upper end of the flanged bearing collar 204. The upper end of spring 224 bears against a projecting peripheral flange 228 encircling the upper portion of sleeve 202. A second helical coil spring 226, somewhat heavier and stiffer than the spring 224, encircles the upper portion of sleeve 202 and plunger rod 194. The lower end of spring 226 bears against the upper side of the flange 228; the upper end of spring 226 bears against a shoulder collar 230 secured to the upper end of plunger rod 194.

Downward motion of plunger rod 194 is produced by the downstroke of a plunger 232 actuated by air cylinder 96. As plunger rod 194 thus begins its downward motion, the lighter spring 224 is the first to be compressed, with the stiffer spring 226 causing sleeve 202 and rod 194 to move downward together. Sleeve 202 is keyed for a sliding vertical relationship within flanged bearing collar 204 and this downward motion continues until chuck block 196 mounted on sleeve 202 is moved downwardly into contact with the upper side of anvil 206.

Further downward movement of plunger rod 194 compresses spring 226 causing relative movement between the rack 195 on rod 194 and the chuck block 196, thus producing pivotal movement of the crank arms 214, and opening the jaws 222.

When air cylinder 96 moves plunger 232 upwardly, the springs 224 and 226 cause collar 230 and rod 194 to move upwardly, closing jaws 222 in the reverse manner to clamp segment 100 again between jaws 222 and anvil 206.

It will be noted that plunger rod 194, sleeve 202, and bearing collar 204 are slidably keyed for relative longitudinal motion in the direction of the axis 102 of rod 194. This sliding keyed construction permits the transmission of rotary motion from gear 192 via plunger rod 194 and sleeve 202 to chuck block 196 and segment 100, thus permitting the work rocking motion of the sector rack 190 actuated by the cam 184 (FIGURE 9) to produce the desired pivotal rocking motion of a segment 100 during the grinding operation.

The cams 234, 236, and 238 mounted at the upper end of the common cam shaft 68 are positioned to actuate the valves 240, 242, and 244 to control the operation of the air cylinder 96 operating the chuck jaw mechanism 92 and also regulating the supply of suction to the gripping mechanism 86 on conveying arm 29, thus providing automatic coordination of these gripping devices with the other motions provided by the machine.

*Changes for grinding triangular segments*

Since many lathe tool bit inserts are formed as triangles designed to fit into a triangular aperture in a tool holder, the grinding machine shown in the figures is adapted to be converted for grinding such triangular segments in the desired configurations and rake angles by a series of simple manual adjustments. A different magazine 98 will ordinarily be employed to hold the supply of the triangular segments, and an appropriately-shaped pair of chuck jaws will be required to conform to the shape of the triangular segments. Corresponding adjustments may be needed in the various elements of the workpiece-gripping chuck jaw mechanism 92 as shown in FIGURES 15–17 to bring the center of the curvature for the ground corners of these triangular segments to the proper location.

Referring to FIGURE 2, the cam shaft 68 and its accompanying mechanisms are all designed for convenient conversion to the grinding of triangular segments by the manual movement of a lever 246 operating an eccentric 248 mounted in housing 76 and acting to shift the cam shaft 68 upwardly.

This upward relocation of cam shaft 68 brings a driving gear 104a into mesh with a driven gear 106a (FIGURES 2 and 4) producing a 3 to 1 speed reduction in the reduction gear train 84, thus causing the conveying arm 29 to deliver a finished segment and to move to the magazine 98 to receive a new blank after every third revolution of the cam shaft 68.

The upward shift of cam shaft 68 brings work repositioning cam 104a into position in place of cam 140, providing a rotary shift of 120 degrees between each grinding cycle, since cam 140a has a greater diameter at its peak than does cam 140 (FIGURE 13) and therefore provides a greater rotary motion of sector rack 146, and 120 degrees rotation of gear 148 and suction grip 154.

In a similar manner, cam 184a (FIGURES 2 and 9) at the upper end of cam shaft 68 is substituted for cam 184, producing a total rocking motion of about 110 degrees to create the radius of curvature on the corner of the triangular segment, as compared with the 80 degree rocking motion produced by cam 184 when square segments are being ground.

Since both the chuck arm 27 and the conveying arm 29 traverse the same distances with the triangular segments, the arm positioning cams are not changed by the shifting upward of cam shaft 68.

*Operating cycle*

After a loaded magazine 98 is installed in the machine shown in FIGURE 1 in its position over the loading station of conveying arm 29 (FIGURE 5), the machine may be put in operation by closing the three switches 250, 252, and 254 (FIGURE 1) respectively starting operation of motor 42, drive motor 60, and the rocking cam mechanism 41 (FIGURE 1) mounted in pedestal 28. The machine will remain in continuous automatic operation and will grind the desired and preselected rake angle and radius of curvature on each corner of the segments loaded in magazine 98 until the supply is exhausted.

As explained in the foregoing detailed description, each successive segment is received by the conveying arm from the dispensing magazine 98 (FIGURE 5) and carried to the transfer station under the chuck arm (FIGURE 6). During this traverse of the conveying arm 29, a partial vacuum is applied to the suction grip 154 to hold the segment in position thereon. At the transfer station, this partial vacuum is cut off and the chuck jaw mechanism 92 closes to grip the blank firmly against the anvil 206 (FIGURE 6).

Chuck arm 27 then begins the grinding operations on this blank by moving it to the grinding wheel 30 (FIGURES 7, 17) and by pivotal rocking of the blank to grind the desired curved corner thereon (FIGURES 18–20). Previous adjustment of the plate 32 (FIGURE 1) provides the desired rake angle upon the ground corner of the tool bit.

After this rounded corner is ground from the tool bit, chuck arm 27 returns to the transfer station and the jaw mechanism 92 opens (FIGURE 8). At the same time a partial vacuum is applied to the suction grip 154, which holds the partially-ground blank in position thereon during the rotary re-positioning of the grip 154 to bring the next unground corner of the blank into grinding position.

Chuck jaws 222 again grip the blank against anvil 206 (FIGURE 6), and this newly-indexed corner of the blank is then ground to the desired radius and rake angle.

Successive re-positioning and grinding steps follow until all corners of the blank are ground, whereupon chuck jaws 222 open for transferring the completed segment to grip 154 (FIGURE 8), or for delivering the completed segment to an exit chute 103 (FIGURE 1). Conveying arm 29 then begins moving toward its loading station under magazine 98 to receive a new blank (FIGURE 5).

The use of a single cam shaft 68 (FIGURE 2) in actuating the various mechanisms and movements of both the chuck arm 27 and the conveying arm 29 permits these two arms and the work-handling devices at their extremities to be as well coordinated as a pair of human hands. This invention provides considerably more strength than human hands could provide in the gripping of the work during grinding, together with automatic and tireless operation, hour after hour.

The machine shown in FIGURE 1 and incorporating the present invention provides all the advantages of a fully automatic machining operation. This single machine tool receives the rough cut blanks and produces therefrom finished tool bits or segments ready for use as cutting tool inserts. The machine shown in FIGURE 1 and disclosed in more detail in the remaining figures is adapted for convenient conversion from square segments to triangular segments, and automatic conversion is possible merely by the operation of the hand lever 246.

By employing two swinging arms 27 and 29 as a dual material-handling mechanism coordinated with the machining operation, unusual flexibility of operation is provided. The segments are thus firmly gripped during the grinding steps and moved in rotary rocking motion during grinding while being firmly held in the chuck jaws. Between grinding steps the tool bit segments are re-positioned or indexed to bring the next corner into grinding position. This re-positioning is achieved at the transfer station closely adjacent to the grinding station, and the work is quickly and automatically re-oriented for the next grinding operation. When all required grinding operations are completed, the work is promptly and automatically released into the exit chute 103 and the next segment to be ground is received and conveyed to the chuck for the next series of grinding operations.

The many adjustments in the chuck mechanism as described above provide unusual precision of adjustment of the work-handling mechanism, thus enhancing the great flexibility made possible by this dual arm arrangement.

The double arm handling mechanism of the present invention is unusually well adapted for use with a grinding wheel, as shown in the drawings. The principles of the present invention may easily be adapted to other types of machining operations, however, and the same advantages of precision and flexibility will be realized in such other embodiments of the invention.

It will thus be seen that the objects set forth above, among those made apparent from the preceding description, are efficiently attained, and since certain changes may be made in the above construction without departure from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described, and all statements of the scope of the invention which, as a matter of language, might be said to fall therebetween.

What is claimed is:

1. In an automatic grinding machine for performing successive grinding operations upon a workpiece, the combination of a supporting frame having a transfer station and a grinding station, a power-driven grinding wheel mounted on said frame at said grinding station, a workpiece-gripping chuck movably mounted on said frame and adapted for movement between said transfer station and said grinding station, a holding mechanism pivotally mounted on said frame at said transfer station independently of said chuck to move said workpiece between successive grinding operations to present a new surface to be ground, said chuck and said holding mechanism being interrelated for holding, moving and re-positioning said workpiece in alternating succession, and means for actuating said chuck and said holding mechanism to move said workpiece from said transfer station to said grinding station and back to said transfer station.

2. In an automatic grinding machine for performing successive grinding operations upon a workpiece, the combination of a supporting frame having a transfer station and a grinding station, a power-driven grinding wheel mounted on said frame, a workpiece-gripping chuck movably mounted on said frame and adapted for movement between said transfer station and said grinding station, a holding mechanism pivotally mounted on said frame independently of said chuck to move said workpiece pivotally at said transfer station between successive grinding operations to present a new surface to be ground, said chuck and said holding mechanism being interrelated for holding and pivotally moving said workpiece in alternating succession, and means for actuating said chuck and said holding mechanism to move said workpiece from said transfer station to said grinding station and back to said transfer station.

3. In an automatic grinding machine for performing successive grinding operations upon a workpiece, the combination of a supporting frame having a loading station, a transfer station, and a grinding station, a power-driven grinding wheel mounted on said frame adjacent said grinding station, a workpiece-gripping chuck movably mounted on said frame and adapted for movement between said transfer station and said grinding station and for further movement at said grinding station, a workpiece-dispensing magazine mounted on said frame at said loading station, a workpiece-holding mechanism movably mounted on said frame and adapted for conveying said workpiece from said magazine to said transfer station and for re-positioning said workpiece at said transfer station between successive grinding operations, said chuck and said holding mechanism being interrelated for gripping and moving said workpiece in alternating succession, and means for actuating said chuck and said holding mechanism in alternate timed relationship to move each of a series of workpieces from said transfer station to said grinding station and back to said transfer station and to reposition each workpiece for the next grinding operation.

4. In an automatic grinding machine for performing successive grinding operations upon a workpiece, the combination of a supporting frame having a loading station, a transfer station, and a grinding station, a power-driven grinding wheel mounted on said frame adjacent said grinding station, a workpiece-dispensing magazine mounted on said frame at said loading station, a workpiece-gripping chuck pivotally mounted on said frame and adapted for movement between said transfer station and said grinding station and for pivotal movement at said grinding station, a workpiece-holding mechanism pivotally mounted on said frame and adapted for conveying said workpiece from said magazine to said transfer station and re-positioning said workpiece pivotally at said transfer station between successive grinding operations, said chuck and said holding mechanism each being adapted for gripping and pivotally moving said workpiece in alternating succession, and means for actuating said chuck and said gripping mechanism to move each of a series of workpieces from said transfer station to said grinding station and back to said transfer station and to reposition each workpiece for the next grinding operation.

5. An automatic machine tool for performing successive machining operations upon a workpiece comprising, in combination, a frame having a loading station, a transfer station, and a machining station, a power-driven workpiece-forming element mounted on said frame adjacent said machining station, a conveying arm pivotally mounted on said frame for movement between said loading station and said transfer station, a chuck arm pivotally mounted on said frame for movement between said transfer station and said machining station for successive machining operations, a releasable workpiece-gripping chuck movably mounted on said chuck arm, holding means movably mounted on said conveying arm, said chuck and said holding means being aligned for transfer of said workpiece therebetween said said arms are at said transfer station, and automatic actuating means mounted on said frame adjacent said arms for operating said arms and said chuck and for positioning said holding means relative to said chuck, whereby said holding means is adapted to deliver a workpiece from said loading station to said chuck and to re-position said workpiece and return it to said chuck between successive machining operations.

6. An automatic machine tool for performing successive machining operations upon a workpiece comprising, in combination, a frame having a loading station, a transfer station, and a machining station, a power-driven workpiece forming element mounted on said frame adjacent said machining station, a conveying arm pivotally mounted on said frame for movement between said loading station and said transfer station, a chuck arm pivotally mounted on said frame for movement between said transfer station and said machining station for successive machining operations, a releasable workpiece-gripping chuck pivotally mounted on said chuck arm, holding means pivotally mounted on said conveying arm, said chuck and said holding means being aligned for transfer of said workpiece therebetween when said arms are at said transfer station, and automatic actuating means mounted on said frame adjacent said arms for operating said arms and said chuck and for positioning said holding means relative to said chuck, whereby said holding means is adapted for delivering said workpiece to said chuck and for repositioning said workpiece and returning it to said chuck between successive machining operations.

7. An automatic machine tool for performing successive machining operations upon a workpiece comprising, in combination, a frame, a power-driven workpiece-forming element mounted on said frame, workpiece-holding means mounted on said frame, a releasable workpiece-gripping chuck movably mounted on said frame to move between said workpiece holding means and said workpiece-forming element, said chuck and said holding means being positioned for transfer of said workpiece therebetween, said holding means being adapted to reposition a workpiece upon release from said chuck, and a timing mechanism interrelated with said chuck and said holding means for operating said chuck and positioning said holding means relative to said chuck.

8. An automatic machine tool for performing successive machining operations upon a workpiece comprising, in combination, a frame, a power-driven workpiece-forming element mounted on said frame, a releasable workpiece-gripping chuck movably mounted on said frame to move between said workpiece holding means and said workpiece-forming element, said chuck and said holding means being positioned for transfer of said workpiece therebetween, said holding means being adapted to reposition a workpiece upon release from said chuck, a power-driven cam shaft mounted on said frame adjacent said chuck and said holding means, and cam follower linkages actuated by said cam shaft and interrelated with said chuck and said holding means for operating said chuck and positioning said holding means relative to said chuck.

9. An automatic machine tool for performing successive grinding operations upon a series of workpieces comprising, in combination, a frame, a power-driven grinding wheel mounted on said frame, a workpiece-dispensing magazine mounted on said frame, workpiece-holding means mounted on said frame, a releasable workpiece-gripping chuck adapted to receive individual workpieces from said magazine and movably mounted on said frame to move between said workpiece holding means and said grinding wheel, said chuck and said holding means being positioned for transfer of said workpiece therebetween, said holding means being adapted to reposition a workpiece upon release from said chuck and return said workpiece to said chuck after repositioning, and a timing mechanism interrelated with said chuck and said holding means for operating said chuck and positioning said holding means relative to said chuck.

10. An automatic machine tool for performing successive grinding operations upon a series of workpieces comprising, in combination, a frame, a power-driven grinding wheel mounted on said frame, a workpiece-dispensing magazine mounted on said frame, a releasable workpiece-gripping chuck movably mounted on said frame, workpiece-holding means movably mounted on said frame and adapted to deliver a workpiece from said magazine to said chuck and to reposition said workpiece and return it to said chuck between successive grinding operations, said chuck being adapted to move between said workpiece holding means and said grinding wheel, and a timing mechanism interrelated with said chuck and said holding means for operating said chuck and positioning said holding means relative to said chuck.

11. An automatic machine tool for performing successive grinding operations upon a workpiece comprising, in combination, a frame, a power-driven grinding wheel mounted on said frame, workpiece-holding means mounted on said frame, a releasable workpiece-gripping chuck positioned adjacent to said grinding wheel and including a chuck block movably mounted on said frame, releasable chuck jaws movably secured to said chuck block, and a chuck-releasing mechanism associated with said chuck block and connected to open said releasable chuck jaws, said chuck and said holding means being positioned for transfer of said workpiece therebetween, said holding means being adapted to reposition a workpiece upon release from said chuck, and a timing mechanism interrelated with said chuck and said holding means for operating said chuck and positioning said holding means relative to said chuck.

12. An automatic machine tool for performing successive grinding operations upon a workpiece comprising, in combination, a frame, a power-driven grinding wheel mounted on said frame, workpiece-holding means mounted on said frame, a releasable workpiece-gripping chuck including a chuck block pivotally mounted on said frame, a pinion joined to said chuck block, and rack means meshing with said pinion for pivotally moving said chuck, said chuck and said holding means being positioned for transfer of said workpiece therebetween, said holding means being adapted to reposition a workpiece upon release from said chuck, and a timing mechanism interrelated with said chuck and said holding means for operating said chuck and said rack means and for positioning said holding means relative to said chuck.

13. An automatic machine tool for performing successive grinding operations upon a workpiece comprising, in combination, a frame, a power-driven grinding wheel mounted on said frame, workpiece-holding means mounted on said frame, a releasable workpiece-gripping chuck movably mounted on said frame to move said workpiece into grinding contact with said grinding wheel and to move said workpiece pivotally while maintaining said grinding contact, said chuck and said holding means being positioned for transfer of said workpiece therebetween, said holding means being adapted to reposition a workpiece upon release from said chuck, and a timing mechanism interrelated with said chuck and said holding means for operating said chuck and for positioning said holding means relative to said chuck.

14. An automatic machine tool for performing successive grinding operations upon a workpiece comprising, in combination, a frame, a power-driven grinding wheel mounted on said frame, workpiece-holding means mounted on said frame, a releasable workpiece-gripping chuck movably mounted on said frame to move said workpiece into grinding contact with said grinding wheel and to move said workpiece pivotally about an axis spaced from the geometric center of said workpiece while maintaining grinding contact with said wheel, said chuck and said holding means being positioned for transfer of said workpiece therebetween, said holding means being adapted to reposition a workpiece upon release from said chuck, and a timing mechanism interrelated with said chuck and said holding means for operating said chuck and for positioning said holding means relative to said chuck.

15. An automatic machine tool for performing successive grinding operations upon a workpiece comprising, in combination, a frame, a power-driven grinding wheel mounted on said frame, workpiece-holding means mounted on said frame, a releasable workpiece-gripping chuck movably mounted on said frame to move between said workpiece holding means and said grinding wheel, said chuck and said holding means being positioned for transfer of said workpiece therebetween, said holding means being adapted to reposition said workpiece pivotally about an axis substantially coinciding with the geometric center of said workpiece upon release from said chuck, and a timing mechanism interrelated with said chuck and said holding means for operating said chuck and for positioning said holding means relative to said chuck.

16. An automatic machine tool for performing successive grinding operations upon a workpiece comprising, in combination, a frame, a power-driven grinding wheel mounted on said frame, workpiece-holding means including a workpiece-supporting unit pivotally mounted on said frame, a pinion joined to said unit, and rack means meshing with said pinion for pivotally positioning said unit, a releasable workpiece-gripping chuck movably mounted on said frame to move between said workpiece holding means and said grinding wheel, said chuck and said holding means being positioned for transfer of said workpiece therebetween, said holding means being adapted to reposition a workpiece upon release from said chuck, and a timing mechanism interrelated with said chuck and said rack means for operating said chuck and for positioning said holding means relative to said chuck.

References Cited in the file of this patent

UNITED STATES PATENTS 2,099,674    Bullock et al.   _____ Nov. 23, 1937

UNITED STATES PATENT OFFICE
CERTIFICATE OF CORRECTION

Patent No. 3,007,286                           November 7, 1961

Frederick R. Marindin

It is hereby certified that error appears in the above numbered patent requiring correction and that the said Letters Patent should read as corrected below.

Column 1, lines 20 and 21, for "sharping" read -- sharpening --; column 2, line 63, for "mov-" read -- movably --; column 5, line 18, for "schematicaly" read -- schematically --; line 60, after "after" insert -- four --; column 6, line 49, for "138" read -- 139 --; line 59, for "opsition" read -- position --; column 8, line 50, for "preferably" read preferable --; column 10, line 47, for "104a" read -- 140a --; column 13, line 42, for "said", first occurrence, read -- when --; column 15, lines 1 and 2, for "successsive" read -- successive --.

Signed and sealed this 24th day of April 1962.

(SEAL)
Attest:

ESTON G. JOHNSON
Attesting Officer

DAVID L. LADD
Commissioner of Patents